US007253865B2

(12) United States Patent
Battersby

(10) Patent No.: US 7,253,865 B2
(45) Date of Patent: Aug. 7, 2007

(54) NON RECTANGULAR DISPLAY DEVICE

(75) Inventor: Stephen J. Battersby, Haywards Heath (GB)

(73) Assignee: Koninklijke Philips Electronics N. V., Eindhoven (NL)

( * ) Notice: Subject to any disclaimer, the term of this patent is extended or adjusted under 35 U.S.C. 154(b) by 108 days.

(21) Appl. No.: 10/517,394

(22) PCT Filed: May 21, 2003

(86) PCT No.: PCT/IB03/02234

§ 371 (c)(1),
(2), (4) Date: Nov. 24, 2004

(87) PCT Pub. No.: WO03/102905

PCT Pub. Date: Dec. 11, 2003

(65) Prior Publication Data
US 2005/0225690 A1 Oct. 13, 2005

(30) Foreign Application Priority Data
May 31, 2002 (GB) ................................ 0212566.4

(51) Int. Cl.
*G02F 1/1343* (2006.01)
(52) U.S. Cl. ...................... 349/146; 349/144; 349/145; 349/152; 349/149; 349/150; 349/151; 257/88; 257/72; 257/293; 257/E33.065; 257/E33.032

(58) Field of Classification Search ................ 349/146, 349/143, 144, 145, 149, 150, 151, 152; 257/E27.131, 257/E27.152, 72, 291, 292, 293, E33.065, 257/E31.032
See application file for complete search history.

(56) References Cited

U.S. PATENT DOCUMENTS 5,311,337 A * 5/1994 McCartney, Jr. ............ 349/145

FOREIGN PATENT DOCUMENTS

WO      WO 01 53883      7/2001

\* cited by examiner

*Primary Examiner*—Matthew Smith
*Assistant Examiner*—Julio Maldonado

(57) ABSTRACT

A display device has an array 40 of pixels and row and column driver circuitry comprising row driver circuit portions R and column driver circuit portions C, each pixel being addressed by a row driver circuit portion R and a column driver circuit portion C which connect to respective row and column conductor lines. The array of pixels has a non-rectangular outer shape, and the device comprises at least three row driver circuit portions R and at least three column driver circuit portions C disposed alternately around the outer periphery of the array. This arrangement enables row and column drivers to be divided into portions which are arranged in such a way that addressing can be provided for complicated display shapes.

20 Claims, 5 Drawing Sheets

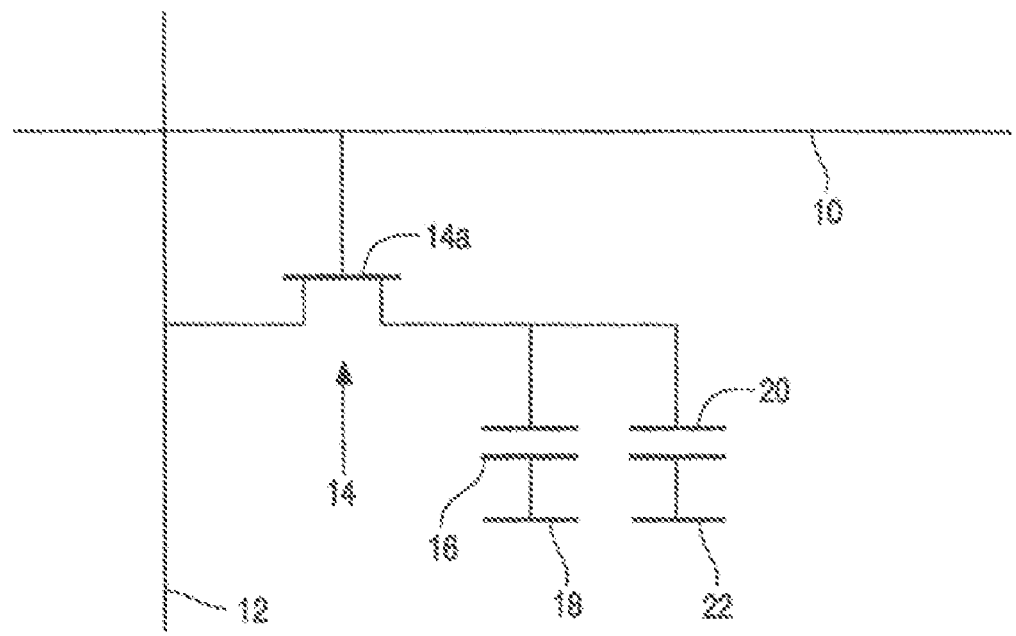
FIG.1 [PRIOR ART]
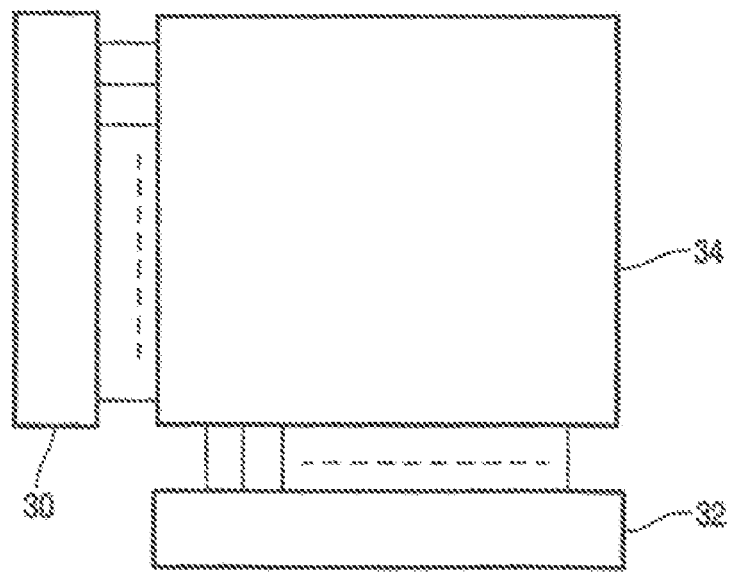
FIG.2 [PRIOR ART]

NON RECTANGULAR DISPLAY DEVICE

This invention relates to display devices, for example active matrix display devices.

Active matrix displays typically comprise an array of pixels arranged in rows and columns. Each row of pixels shares a row conductor which connects to the gates of the thin film transistors of the pixels in the row. Each column of pixels shares a column conductor, to which pixel drive signals are provided. The signal on the row conductor determines whether the transistor is turned on or off, and when the transistor is turned on, by a high voltage pulse on the row conductor, a signal from the column conductor is allowed to pass on to an area of liquid crystal material (or other capacitive display cell), thereby altering the light transmission characteristics of the material.

FIG. 1 shows a conventional pixel configuration for an active matrix liquid crystal display. The display is arranged as an array of pixels in rows and columns. Each row of pixels shares a common row conductor 10, and each column of pixels shares a common column conductor 12. Each pixel comprises a thin film transistor 14 and a liquid crystal cell 16 arranged in series between the column conductor 12 and a common electrode 18. The transistor 14 is switched on and off by a signal provided on the row conductor 10. The row conductor 10 is thus connected to the gate 14a of each transistor 14 of the associated row of pixels. Each pixel additionally comprises a storage capacitor 20 which is connected at one end 22 to the next row electrode, to the preceding row electrode, or to a separate capacitor electrode. This capacitor 20 stores a drive voltage so that a signal is maintained across the liquid crystal cell 16 even after the transistor 14 has been turned off.

In order to drive the liquid crystal cell 16 to a desired voltage to obtain a required gray level, an appropriate signal is provided on the column conductor 12 in synchronism with a row address pulse on the row conductor 10. This row address pulse turns on the thin film transistor 14, thereby allowing the column conductor 12 to charge the liquid crystal cell 16 to the desired voltage, and also to charge the storage capacitor 20 to the same voltage. At the end of the row address pulse, the transistor 14 is turned off, and the storage capacitor 20 maintains a voltage across the cell 16 when other rows are being addressed. The storage capacitor 20 reduces the effect of liquid crystal leakage and reduces the percentage variation in the pixel capacitance caused by the voltage dependency of the liquid crystal cell capacitance.

The rows are addressed sequentially so that all rows are addressed in one frame period, and refreshed in subsequent frame periods.

As shown in FIG. 2, the row address signals are provided by row driver circuitry 30, and the pixel drive signals are provided by column address circuitry 32, to the array 34 of display pixels.

Displays are conventionally rectangular in shape, and this enables all pixels in the display to be addressed using a single row driver circuit and a single column address circuit, as shown in FIG. 2. However, designers now wish to incorporate non-rectangular displays into product designs, and this requires modification to arrangement of the row and column driver circuits. This is the subject of this invention.

WO 93/04460 discloses a display which has a circular display area over a square mounting substrate. The row and column driver circuits are mounted in the corners of the square, so that the display area is maximised for a given square substrate. There are two row driver circuits and two column driver circuits arranged in alternating order in the four corners of the substrate.

According to the invention, there is provided a display device comprising an array of pixels and row and column driver circuitry comprising row driver circuit portions and column driver circuit portions, each pixel being addressed by a row driver circuit portion and a column driver circuit portion which connect to respective row and column conductor lines, the array of pixels having a non-rectangular outer shape, wherein the device comprises at least three row driver circuit portions and at least three column driver circuit portions disposed around the outer periphery of the array, wherein the row and column driver circuit portions alternate around the outer periphery.

This arrangement enables row and column drivers to be divided into portions which are arranged in such a way that addressing can be provided for complicated display shapes, in particular shapes which need the row and column driver circuits to be divided into three or more portions.

Preferably, transitions between pairs of adjacent row and column driver circuit portions are at first locations of the outer periphery where the tangent to the outer shape is parallel to the row or column conductor lines. However, one or more transitions between pairs of adjacent row and column driver circuit portions are preferably at second locations of the outer periphery across the array of pixels in a row or a column direction from a first location. By defining these first and second transition points, the outer periphery can be divided into sections which enable all pixels to be reached by a row and column conductor.

For complicated shapes, one or more further transitions between pairs of adjacent row and column driver circuit portions can be required at third locations of the outer periphery across the array of pixels in a row or a column direction from a second location.

The row and column driver circuit portions can extend around the full periphery of the array of pixels, or else at least one gap may be provided in the row and column driver circuit portions around the periphery of the array of pixels. This gap may comprise a region of the outer periphery which is substantially linear and parallel to the row or column conductor lines, or else a region of the outer periphery which is between first locations which are points of inflection.

The array of pixels may be designed to have symmetry about at least one of the row and column directions, as this reduces the number of transition points and thereby the number of row and column driver circuit portions.

As the row driver circuit is divided into portions, some communication is required between the portions, so that the rows can be addressed in sequence automatically. Preferably, each row driver circuit portion includes means for detecting a signal from another row driver circuit portion. This means for detecting a signal may in particular be coupled to a row conductor associated with the other row driver portion, such that each row driver circuit portion can detect a signal on at least one row conductor of at least one other row driver circuit portion.

The invention also provides a method of determining the positioning of row driver circuit portions and column driver circuit portions around the periphery of an array of pixels of a display device, the device comprising pixels each to be addressed by a row driver circuit portion and a column driver circuit portion which connect to respective row and column conductor lines and the array of pixels having a non-rectangular outer shape, wherein the method comprises:

identifying first locations of the outer periphery where the tangent to the outer shape is parallel to the row or column conductor lines;

identifying second locations, if any, of the outer periphery across the array of pixels in a row or a column direction from the first locations which do not correspond to the first locations;

identifying third and subsequent locations, if any, of the outer periphery across the array of pixels in a row or a column direction from the second and subsequent locations which do not correspond to already identified locations; and arranging the row and column driver circuit portions alternately around the outer periphery with transitions between row and column driver circuit portions at the identified locations.

This method identifies the points where transition between row and column driver circuit portions is required. In this method, a location of the outer periphery is considered to correspond to a first location if it is adjacent a first location and separated from the first location by a substantially linear portion of the outer shape along the tangent. This approach can enable a reduction in the number of identified locations and corresponding reduction in the number of driver circuit portions.

Preferably, the step of arranging the row and column driver circuit portions comprises arranging at least three row driver circuit portions and at least three column driver circuit portions.

Examples of the invention will now be described in detail with reference to the accompanying drawings, in which:

FIG. 1 shows one example of a known pixel configuration for an active matrix liquid crystal display;

FIG. 2 shows a display device including row and column driver circuitry;

Figure 3:
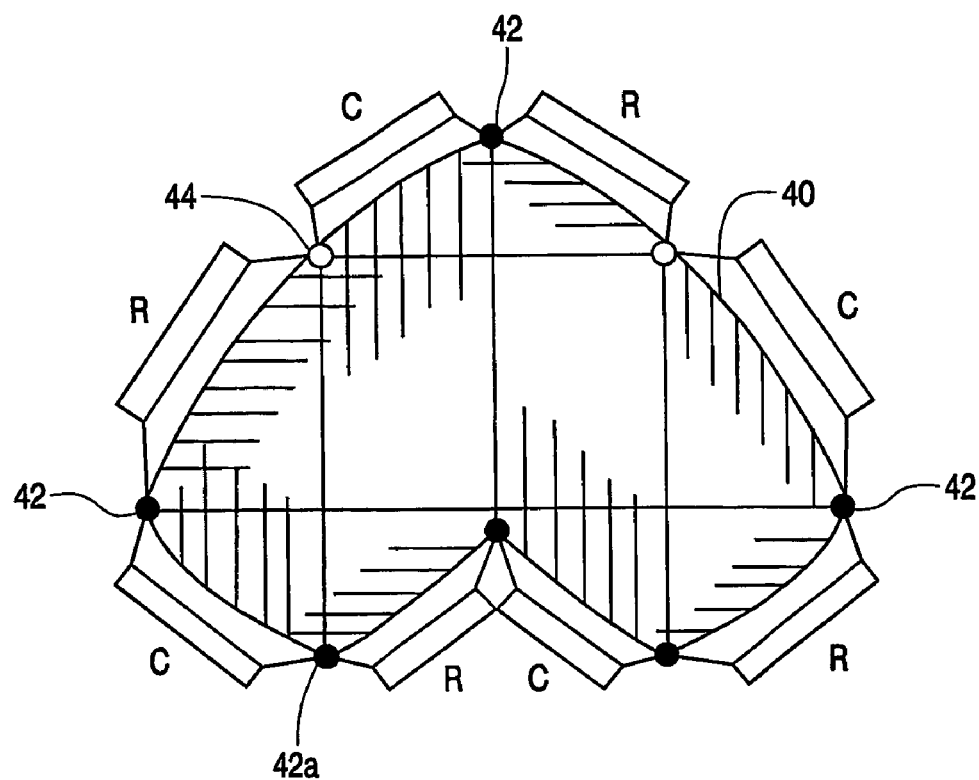
FIG. 3 shows a first example of display device of the invention.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar features in modified and different embodiments.

FIG. 3 shows a first example of display device of the invention. The device has an array of pixels having a non-rectangular outer shape 40. To ensure that each pixel within the array is coupled to row and column driver circuits, the row and column driver circuitry is divided into row driver circuit portions "R" and column driver circuit portions "C". As shown in FIG. 3, each circuit portion connects to a region of the outer shape 40. The row driver circuit portions "R" and the column driver circuit portions "C" are arranged alternately around the periphery of the array of pixels, with at least three of each. This alternating arrangement enables complicated display shapes to be addressed.

The invention is particularly directed to the allocation of row and column driver circuit portions to different parts of the periphery of the array of pixels. In particular, the invention provides a method of determining at which points around the periphery transitions are required between adjacent row and column driver circuit portions. The method of determining the position of these transitions will now be explained still with reference to FIG. 3.

The first step is to identify locations around the outer shape 40 where the tangent to the shape is parallel to the row or column conductor lines. In the example of FIG. 3, the row and columns are horizontal and vertical, although this does not need to be the case. The bold points 42 indicate these first locations.

For each of these first locations 42, a projection is made to the opposite side of the display area, running along a row electrode or a column electrode, as the case may be. For example, the first location 42*a* projects to a second location 44, which is identified as a hollow circle in FIG. 3. There are two such second locations in the arrangement of FIG. 3. In the method, third and subsequent locations are also identified on the opposite side of the display from the second locations 44, but these are only identified as third locations if they have not previously been identified.

In the example of FIG. 3, there are two second locations only, and no third or subsequent locations.

When all of these points have been identified, they define the transitions between row and column driver circuit portions around the outer periphery of the array.

It can be seen from FIG. 3 that this arrangement ensures that for any pixel of the display, one end of the row conductor leads to a row driver circuit portion "R", and the other end of the row conductor leads to a column driver circuit portion "C". Similarly, for any pixel one end of the associated column conductor leads to a column driver circuit portion "C" and the other end of the column conductor leads to a row driver circuit portion "R".

The display shape of FIG. 3 has symmetry about a central axis extending in the column conductor direction. This symmetry helps to reduce the number of row and column driver circuit portions required around the periphery of the display. This will be explained in greater detail below.

Various additional examples will now be given of the invention. In each case, the same symbols are used as in FIG. 3. Thus, a solid circle represents a "first location" which is a point around the periphery 40 at which the tangent extends in the row or column direction. The hollow circles represent so called "second or subsequent locations".

Figure 4:
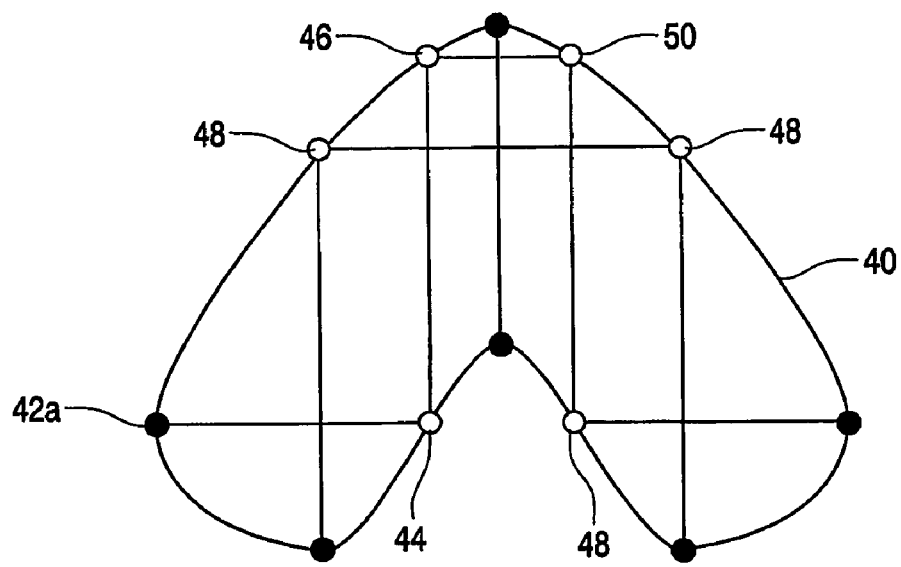
FIG. 4 shows a second example of display device of the invention.

FIG. 4 shows a display shape in which additional transition points are required. In particular, location 42*a* is a first tangential location. Position 44 is across the row of pixels in a row direction from the point 42*a* and is accordingly a "second location". In this case, position 46 is a "third location", as it extends across the array in the column direction from the second location 44, and still does not correspond to a previously identified position. Thus, in the example of FIG. 4, there are six "first locations", four "second locations" 44, 48 and two "third locations" 46, 50. As in the example of FIG. 3, the row and column driver circuit portions are arranged alternately around the periphery (not shown).

As mentioned above, the symmetry of the shapes in FIGS. 3 and 4 helps to reduce the number of transition points. For an arbitrary shape, there can be a vast number of transition points. For example, even the simple oval of FIG. 5 can result in a large number of transition points, even from a single tangential "first location" 42. There are various ways to overcome this potential problem. The first approach is to select the exact display shape with the division into row and column driver sections taken into consideration.

Figure 5:
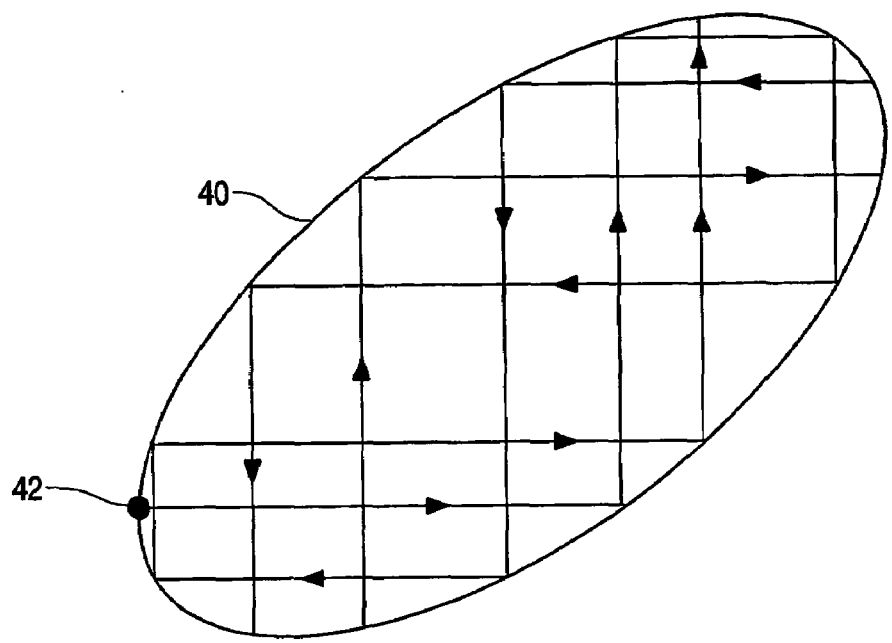
FIG. 5 shows how some display shapes can lead to large numbers of required row and column driver circuit portions.
Figure 6:
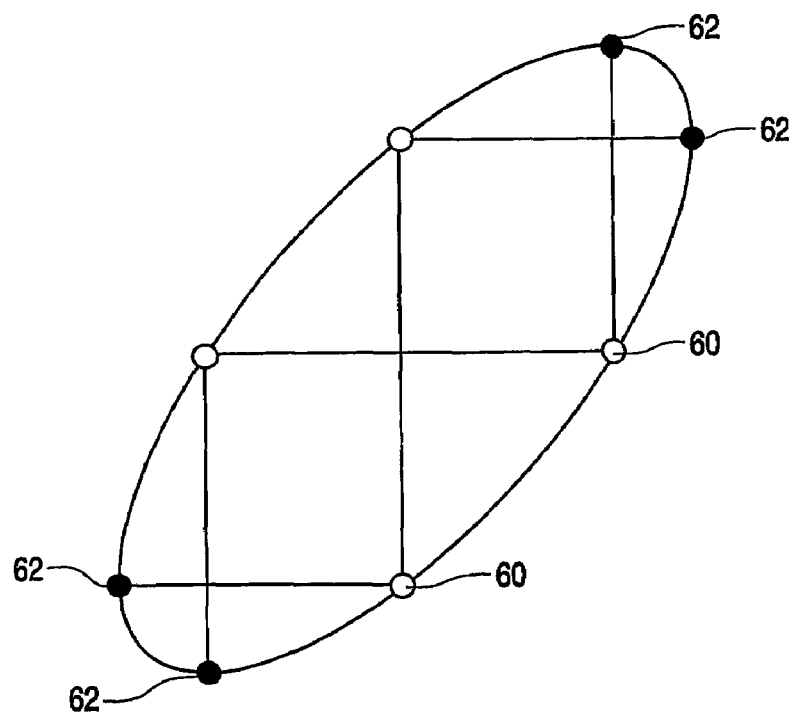
FIG. 6 shows a third example of display device of the invention.

For example, FIG. 6 shows a similar display shape to FIG. 5, but with a very slightly different orientation with respect to the row and column directions. This slight change in orientation results in only four "second locations" 60 in addition to the four tangential "first locations" 62.

Figure 7:
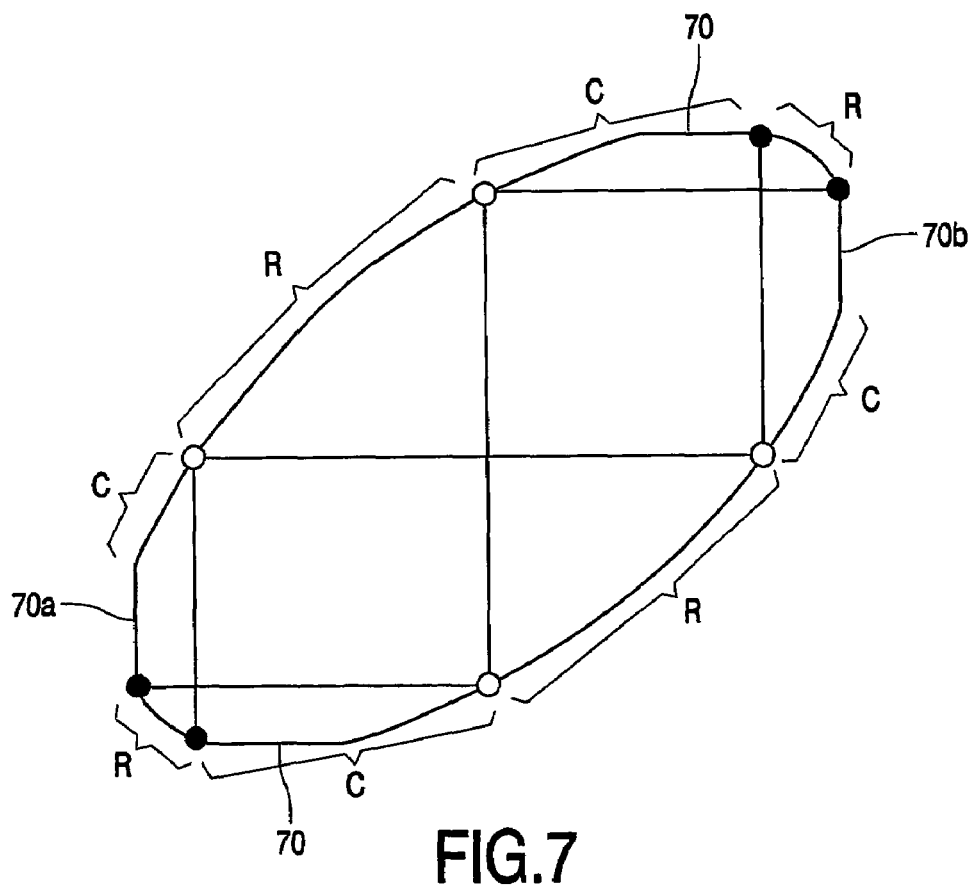
FIG. 7 shows how the display shape of FIG. 6 may be modified to reduce the required number of circuit portions and is a fourth example of display device of the invention.

An alternative approach is to modify short portions of the outer shape to make them into short straight sections in the row or column directions. The shape of FIG. 7 corresponds to that of FIG. 5, but with four straight edge sections 70. When identifying the "first locations", there is a choice of any position along these straight edges. In other words, a section of the outer periphery can be considered to correspond to a tangential "first location" if it is close to the actual tangential point and separated only by a substantially linear portion. As shown in FIG. 7, this freedom in the choice of the initial starting points can enable a reduction in the number of transitions to be achieved. Thus, the example of FIG. 7 has four "first locations" and four "second locations", similar to the example of FIG. 6.

One consequence of the existence of linear sections in the row and column directions is that row and column driver circuit portions may not be required around the entire periphery of the array. As shown in FIG. 7, two of the linear sections 70a and 70b do not require driver circuitry.

Figure 8:
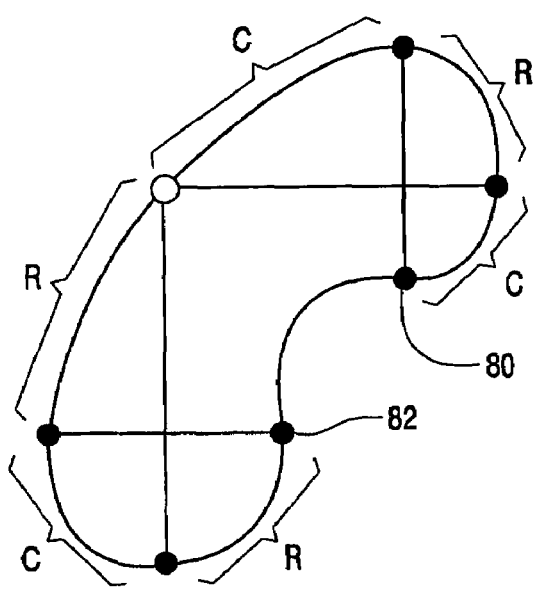
FIG. 8 is one example of display shape where row and column circuits are not required all around the display and is a fifth example of display device of the invention.

FIG. 8 shows another situation in which row and column driver circuitry is not required around the full periphery. In this case, the "first locations" 80 and 82 are points of inflection, rather than maxima or minima. As illustrated in FIG. 8, there is no need for row or column driver circuitry between these two points 80, 82.

Figure 9:
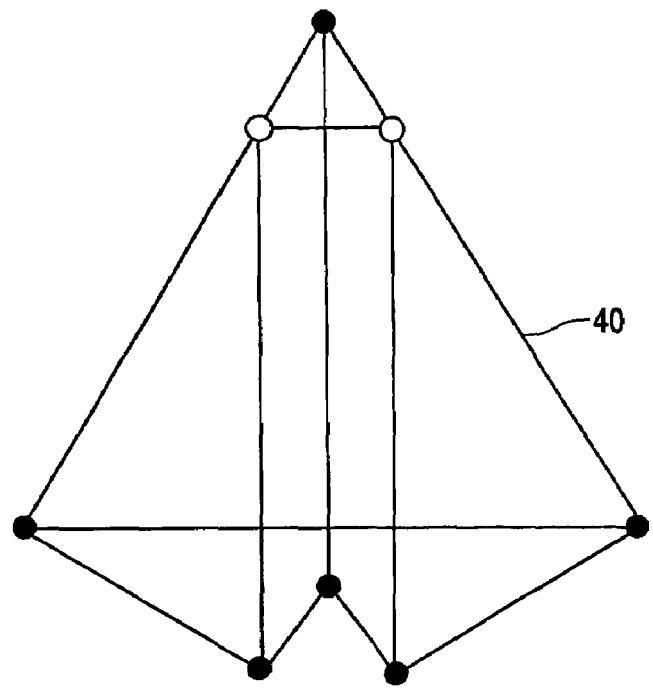
FIG. 9 shows a sixth example of display device of the invention.

The examples above all have a curved outer periphery. However, it should be understood that the invention can be applied to display shapes with straight edges. FIG. 9 shows one example.

Figure 10:
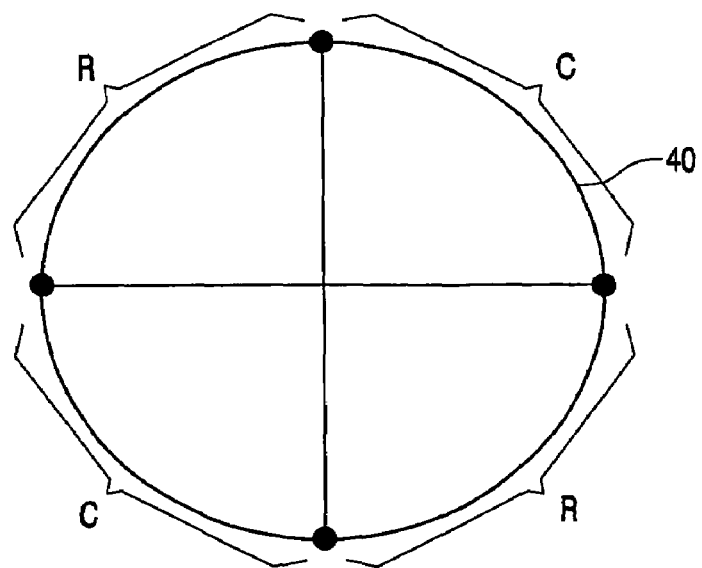
FIG. 10 show how the design method of the invention can be applied to simple design shapes.

The method of the invention for determining the transitions points has been explained with relatively complex display shapes. However, the method can be applied to more simple display shapes, for example the circular display shown in FIG. 10.

In a conventional rectangular display, the row driver circuitry is arranged along one edge of the display. The row driver essentially comprises a shift register for sequentially applying a row address pulse to the row conductors. Thus, the timing of a signal applied to one row conductor is dictated by the timing of a signal applied to the preceding row conductor.

The invention requires the row and column driver circuitry to be divided into portions. In this case, at the end of one row driver circuit portion, a carry signal must pass to the opposite side of the display to the beginning of the next row driver circuit portion. It is possible for the row voltage itself on the last row associated with one row driver circuit portion to be used as the carry signal for the next row driver circuit portion. Thus, the last row on one row driver circuit portion would be connected to a first element acting as a detecting element in the next row driver circuit portion. This detecting element would detect the rising or falling edges of the row voltage and use this to initiate a new carry signal with appropriate timing for the next row. The timing of the row address signals applied to subsequent rows would then be achieved using the normal shift register approach.

The row and column driver circuit portions may be formed on the same substrate as the display pixels, for example the pixels and driver circuitry may be formed using polysilicon processing technology. Alternatively, the driver circuit portions may be on a different substrate or substrates to the display area. They may comprise discrete chips which connect to an amorphous silicon display substate.

The terms "row" and "column" are somewhat arbitrary in the description and claims. These terms are intended to clarify that there is an array of elements with orthogonal lines of elements sharing common connections. Although a row is normally considered to run from side to side of a display and a column to run from top to bottom, the use of these terms is not intended to be limiting in this respect.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any Claim and whether or not it mitigates any or all of the same technical problems as does the present invention.

The invention claimed is:

1. A display device comprising:
an array of pixels, and
row and column cover circuitry that includes:
    row driver circuit portions, and
    column driver circuit portions,
each pixel being addressed by a row driver circuit portion and a column driver circuit portion that connect to respective row and column conductor lines,
the array of pixels having a non-rectangular outer shape, wherein;
the device includes at least three row driver circuit portions and at least three column driver circuit portions disposed around the outer periphery of the array, and
the row and column driver circuit portions alternate around the outer periphery.

2. The device of claim 1, wherein transitions between pairs of adjacent row and column driver circuit portions are at first locations of the outer periphery where the tangent to the outer shape is parallel to the row or column conductor lines.

3. The device of claim 2, wherein one or more transitions between pairs of adjacent row and column driver circuit portions are at second locations of the outer periphery across the array of pixels in a row or a column direction from a first location.

4. The device of claim 3, wherein one or more further transitions between pairs of adjacent row and column driver circuit portions are at third and subsequent locations, if any, of the outer periphery across the array of pixels in a row or a column direction from a second location and subsequent locations that do not correspond to other transitions.

5. The device of claim 4, wherein the row and column driver circuit portions extend around the full periphery of the array of pixels.

6. The device of claim 4, wherein at least one gap is provided in the row and column driver circuit portions around the periphery of the array of pixels, the gap including a region of the outer periphery that is substantially linear and parallel to the row or column conductor lines.

7. The device of claim 3, wherein the row and column driver circuit portions extend around the full periphery of the array of pixels.

8. The device of claim 3, wherein at lent one gap is provided in the row and column driver circuit portions around the periphery of the array of pixels, the gap including a region of the outer periphery that is substantially linear and parallel to the row or column conductor lines.

9. The device of claim 2, wherein at least one gap is provided in the row and column driver circuit portions around the periphery of the array of pixels, the gap including a region of the outer periphery that is between first locations that are points of inflection.

10. The device of claim 2, wherein the row and column driver circuit portions extend around the full periphery of the array of pixels.

11. The device of claim 2, wherein at least one gap is provided in the row and column driver circuit portions around the periphery of the array of pixels, the gap comprising a region of the outer periphery that is substantially linear and parallel to the row or column conductor lines.

12. The device of claim 1, wherein the row and column driver circuit portions extend around the full periphery of the array of pixels.

13. The device of claim 1, wherein at least one gap is provided in the row and column driver circuit portions around the periphery of the array of pixels, the gap including a region of the outer periphery that is substantially linear and parallel to the row or column conductor lines.

14. The device of claim 1, wherein the array of pixels has symmetry about at least one of the row and column directions.

15. The device of claim 1, wherein each row driver circuit portion includes means for detecting a signal from another row driver circuit portion.

16. The device of claim 15, wherein the means for detecting a signal is coupled to a row conductor associated with the another row driver portion, such that each row driver circuit portion can detect a signal on at least one row conductor of at least one other row driver circuit portion.

17. The device of claim 1, including
a plurality of row drivers, each row driver being coupled to a corresponding row driver circuit portion, and
a plurality of column drivers, each column driver being coupled to a corresponding column driver circuit portion.

18. The device claim 17, wherein at least one gap is provided in the row and column driver circuit portions around the periphery of the array of pixels, the gap including a region of the outer periphery that is not associated with a corresponding row or column driver.

19. The device of claim 18, wherein the gap includes a region of the outer periphery that is substantially linear and parallel to the row or column conductor lines.

20. The device of claim 18, wherein the gap includes a region of the outer periphery that is between points of inflection of the periphery.

* * * * *